United States Patent [19]

Sawyer

[11] Patent Number: 4,828,401
[45] Date of Patent: May 9, 1989

[54] TEMPERATURE MONITORING APPARATUS AND METHOD THEREFOR

[75] Inventor: David E. Sawyer, El Cerrito, Calif.

[73] Assignee: Systron Donner, Concord, Calif.

[21] Appl. No.: 63,160

[22] Filed: Jun. 17, 1987

[51] Int. Cl.⁴ .................................. G01K 7/00
[52] U.S. Cl. ................................ 374/178; 73/753; 374/110; 374/137
[58] Field of Search ............... 374/110, 111, 112, 114, 374/116, 137, 178, 6; 73/753, 754, 727; 313/10; 331/66; 333/139

[56] References Cited

U.S. PATENT DOCUMENTS

| | | | |
|---|---|---|---|
| 2,912,163 | 11/1959 | Vantuyl | 374/110 |
| 3,183,705 | 5/1965 | Welkowitz | 374/178 |
| 3,272,012 | 9/1966 | Seney | 374/110 |
| 3,307,401 | 3/1967 | Bachuan | 374/178 |
| 3,421,375 | 1/1969 | Dimon | 374/178 |
| 3,592,059 | 7/1971 | Chilton | 374/178 |
| 3,791,217 | 2/1974 | Stolit et al. | 374/178 |
| 3,808,469 | 4/1974 | Ramond | 374/178 |
| 3,922,640 | 11/1975 | Ruof | 374/111 |
| 4,176,554 | 12/1979 | Kazmierowicz | 374/137 |
| 4,562,429 | 12/1985 | Conway et al. | 340/657 |
| 4,576,485 | 3/1986 | Lambert | 374/130 |
| 4,699,519 | 10/1987 | Persson | 374/111 |

FOREIGN PATENT DOCUMENTS

| | | | |
|---|---|---|---|
| 0153224 | 12/1981 | Fed. Rep. of Germany | 374/163 |
| 1168421 | 12/1958 | France | 374/114 |
| 0019878 | 2/1978 | Japan | 374/178 |
| 1232958 | 5/1986 | U.S.S.R. | 374/178 |

Primary Examiner—William A. Cuchlinski, Jr.
Assistant Examiner—Thomas B. Will
Attorney, Agent, or Firm—Flehr, Hohbach, Test et al.

[57] ABSTRACT

Temperature is monitored along a linear path by utilizing a plurality of temperature sensitive diodes spaced along the path. These are connected at separate and spaced taps of a delay line, a pulse is propagated down the delay line and the effect of the temperature influenced conductivity of the diode on the pulse as it passes a respective diode is sensed.

7 Claims, 2 Drawing Sheets

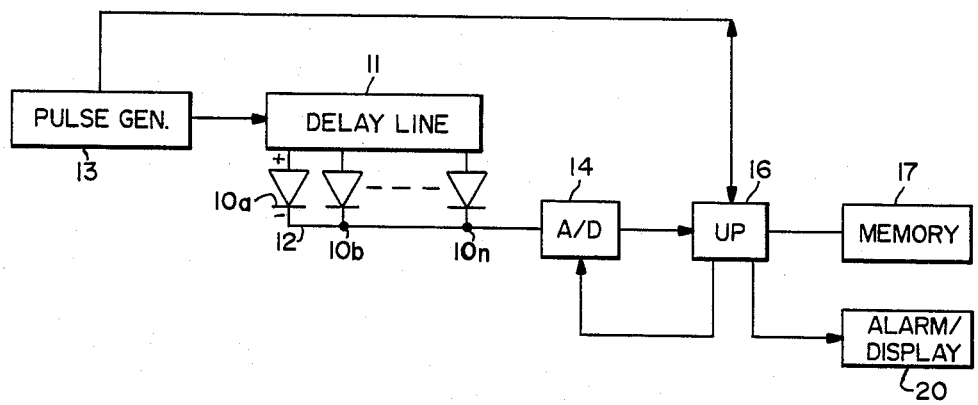
FIG.—1
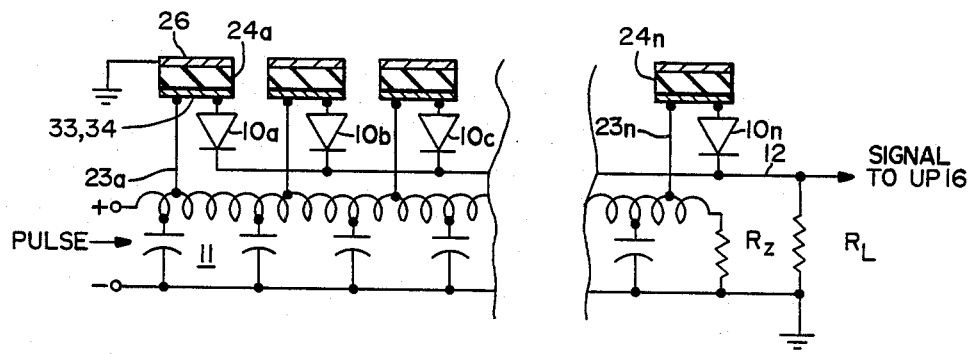
FIG.—2
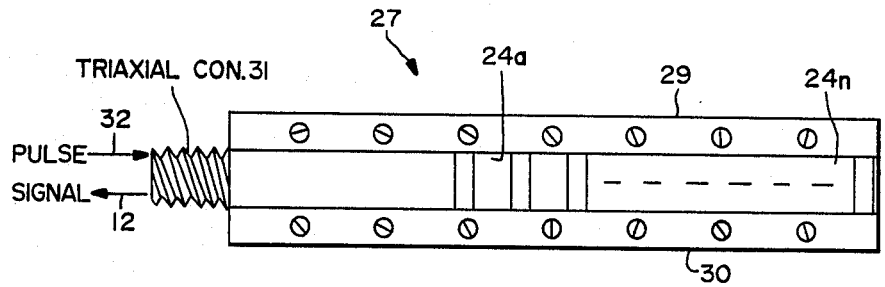
FIG.—3

TEMPERATURE MONITORING APPARATUS AND METHOD THEREFOR

BACKGROUND OF THE INVENTION

The present invention is directed to temperature monitoring apparatus and a method therefor, and more particularly to an apparatus for monitoring temperature along a substantially linear distance.

It has been found useful to obtain temperature profiles for various control and emergency and safety uses. For example, in the control of a kiln, as shown in U.S. Pat. No. 4,176,554, an array of spaced thermocouple monitors provides a temperature profile to implement automatic control of the kiln. In addition to the use of thermocouples, a light fiber technique to detect for example, hot spots, is disclosed in U.S. Pat. No. 4,576,485.

Another application of temperature monitoring is, for example, in aircraft use. Here, is desirable to have a very lightweight, simple but yet reliable device. The foregoing thermocouple and fiber optic systems are not believed to be suitable for such use.

OBJECTS AND SUMMARY OF INVENTION

It is therefore a general object of the present invention to provide an improved temperature monitorin apparatus and method therefor.

In accordance with the above objects, there is provided a temperature monitoring apparatus comprising a linear array of a plurality of thermal conductors, each responsive to thermal conditions in its proximity; a plurality of diodes are each thermally connected to one of the thermal conductors and have a current-voltage characteristic sensitive to temperature and also have first and second polarity terminals;

a delay line is provided having a plurality of spaced taps with each tap being connected to similar polarity terminals of the diodes;

a common signal return line is electrically connected to the other polarity terminal of all of the diodes; pulse generating means are connected to the delay line and propagate a pulse down the line past each of the taps;

then processing means connected to the signal return line converts signals on this line resulting from the propagating pulse and by use of the current voltage characteristics of the various diodes converts the signal to a temperature value.

A corresponding method is provided where temperature sensitive diodes are spaced along a linear path connected to spaced taps of a delay line. After a pulse is propagated down the delay line, there is sensed the effect of the temperature influenced conductivity for each diode on each of the pulses as it passes a respective diode.

BRIEF DESCRIPTION OF THE DRAWINGS

FIG. 1 is a block diagram of the electrical circuit embodying the present invention.

FIG. 2 is a more detailed circuit schematic of a portion of FIG. 1.

FIG. 3 is a simplified plan view of the physical embodiment of the circuit of FIG. 2.

DETAILED DESCRIPTION OF PREFERRED EMBODIMENT

Figure 6:
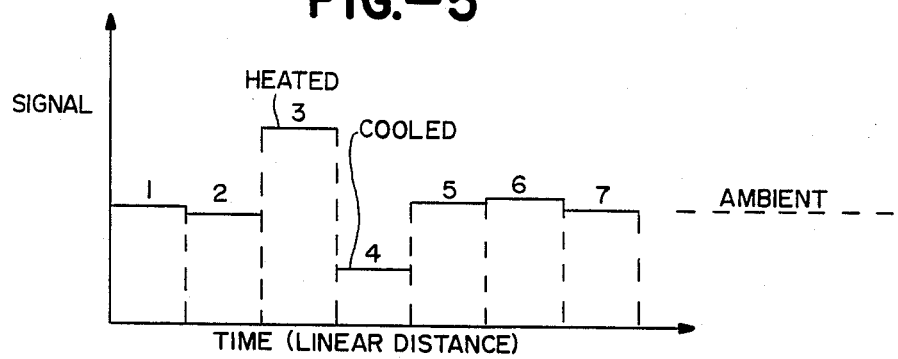
FIG. 6 is another curve illustrating the operation of the present invention.

Referring now to FIGS. 1 and 2, there is illustrated a linear array of temperature sensitive diodes 10a, 10b and 10n. These are actually physically spaced to sense the ambient temperature in physical proximity to them. One polarity terminal, for example, the arbitrarily terminal designated '+' is connected to spaced taps 23a, 23b ... 23n of a delay line 11 with the other terminal (arbitrarily designated '−') connected to a common signal return line 12. A pulse generator 13 is connected to the delay line for propagating a pulse down the line past each of the diodes. The resulting signal on line 12 is converted to a digital format by analog to digital converter 14 and these signals are then processed in microprocessor 16 with the aid of memory 17. An alarm/display unit 20 provides appropriate alarms and graphic readouts. For example, in the case of alarms, they could indicate either an overheat or an underheat condition at any or all of the sensing locations. A graphic readout might be, for example, as shown in FIG. 6 which would be a video display in the form of a bar graph showing the temperature of each diode.

Figure 5:
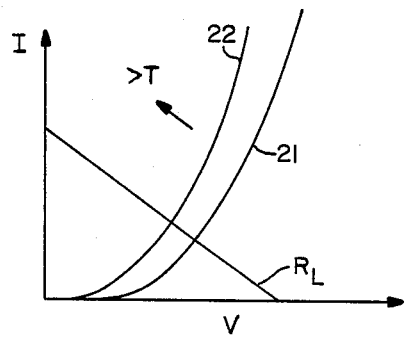
FIG. 5 is a characteristic curve illustrating the operation of the present invention.

Briefly referring to FIG. 5, each of the diodes 10 has a voltage-current characteristic which is sensitive to temperature. Thus, characteristic 21 represents a lower temperature and characteristic 22 an increased temperature. Thus, referring to the load line designated $R_L$ with a voltage which proceeds along the load line $R_L$, the greater temperature produces a higher magnitude current signal.

Now referring to the more detailed circuit schematic of FIG. 2, the delay line is of a typical LC type as shown. Along the inductive portion of the delay line there are the spaced taps 23a, etc., each with a subscript related to the diode with which it is associated. Each tap is connected to its associated diode, as will be shown in detail below, and each diode is associated with and in fact thermally connected to a linear array of thermal conductors 24a to 24n. The thermal conductors are electrically insulating and are of a thin plate-like configuration consisting of electrically insulating materials such as alumina or beryllia. The side of the thermal conductor 24 opposite the diode 10 is coated with, for example, aluminum or copper 26, to provide for isolation from ambient electromagnetic radiation. Delay line 11 is terminated in a resistor $R_Z$ and the return signal line 12 terminated in a load resistor $R_L$.

FIG. 3 illustrates how the several conductors 24a through 24n are actually physically mounted in an elongated tube-like holder 27 which has a square cross section. Each thermal conductor 24 is spaced from the adjacent thermal conductor in order to minimize the temperature influence of the adjacent conductor and thus to provide an accurate sensing of the ambient temperature condition in that particular locality. The thermal conductors 24 are retained by the rails 29 and 30.

For convenience of mounting and control in the remote location of an airplane wing, for example, a single triaxial connector 31 is provided which has, for example, a ground terminal and two active lines, one being for the pulse input indicated at 32 of pulse generator 13 and one for the signal return line 12.

Figure 4:
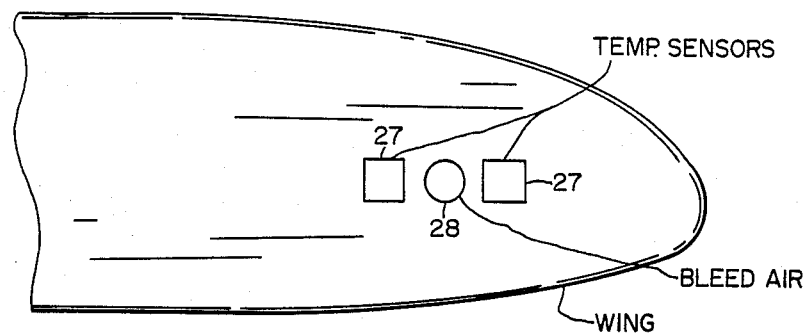
FIG. 4 is a very simplified cross-sectional view of an airplane wing indicating the implementation of the present invention.

FIG. 4 illustrates a typical installation of the temperature sensor units 27 where they are shown in their square cross section and are mounted adjacent a bleed air tube 28 in the wing of an airplane. Such bleed air unit is used for deicing, for example. Other applications might be on a thermal processing conveyor belt or in fact any application where there is a spaced distribution of temperature which must be monitored.

Figures 7A, 7B:
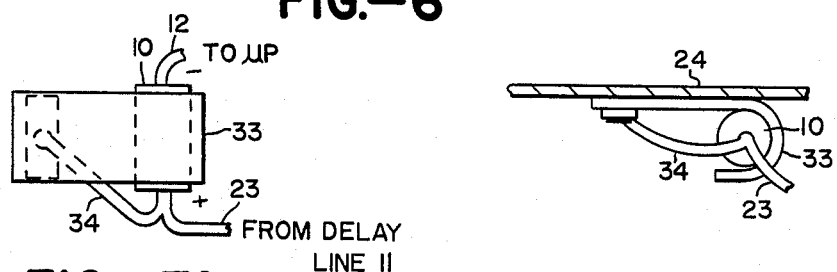
FIG. 7A is a detailed plan view of a portion of FIG. 2.
FIG. 7B is a side view of FIG. 7A.

FIGS. 7A and 7B illustrate the actual mounting of a typical diode 10 to its thermal conductor 24. This is accomplished by a highly thermally conductive mounting clip 33, for example, constructed of copper, which is then soldered to the thermal conductor 24 by, for example, a high temperature solder.

One polarity side, that is, in this specific case a positive polarity side, from the delay line 11 is also soldered to connector 33, as shown by the line 34, to put the diode's outer shield capacitance in parallel with the delay line which can easily accommodate this capacitance. The negative side of the diode 10 extends to the microprocessor on the return line 12. Diode 10 may be any semiconductor type diode since all of these are influenced by temperature. Diode type is not critical.

FIG. 6 illustrates a typical signal output, highly simplified, on the return line 12 with the numbers 1 through 7 indicating the signal from each separate diode. These are of course spaced in time because of the propagation time of the delay line. Thus, the diode 3 shows a greater signal as indicated because this is where the temperature is higher or heat is present. And diode 4 is a cooled condition and thus exhibits a lessersignal in accordance with the characteristic curves of FIG. 5. Note that the remaining diodes are roughly at what is termed the ambient level. Since every voltage current characteristic and every diode may vary, for improved accuracy, referring to FIG. 1, the memory 17 would contain a calibrated characteristic for a particular delay line diode configuration which would compensate for the variations. In other words, this would be a well known "factory calibration."

Another variation of the invention which might be desirable where a very long delay line is utilized and thus where the signal is significantly attenuated is to for example, split the delay line 11 into two portions injecting at the proper delayed time a signal of increased amplitude in the delay line at this second portion. This is to maintain the signal above any noise levels. Again the signal level can easily be compensated by a factory calibration and the storage of this calibration in the memory 17.

Although diodes have been shown as a key element in reacting to ambient temperature, equivalents to diodes which in effect gate the temperature information by acting as a one way electrical valve may be used. All that is necessary is that, because of the nature of the traveling wave, when a signal to one diode is gated through with, for example, temperature or pressure information (in other words, becomes conductive), that the remaining "diode means" will not act as shunts or otherwise affect this signal. In other words, the use of diodes provides the necessary time multiplexing, as illustrated in FIG. 6.

The invention is also useful, in addition to measuring temperature, for other distributed quantities, such as pressure or in fact any other ambient condition. All that is necessary is a sensing unit sensitive to a predetermined ambient condition with the condition determining the value of a variable of said unit; for example, in the present case, the temperature of the unit. Then the diode means are connected to the unit and the variation of this variable causes a change in the current voltage characteristic. For example, a measurement of pressure might be accomplished by the use of a piezoelectric element which changes in resistance when pressure is applied to it. Thus, this change in resistance will be reflected in a change in the diode current which will be proportional to a value of the pressure variable.

Thus an improved temperature monitoring apparatus and method therefor has been provided.

I claim:

1. Temperature monitoring apparatus comprising:
   a linear array of a plurality of thermal conductors, each responsive to thermal conditions in its proximity;
   a plurality of diodes, each thermally connected to one of said thermal conductors and having a current voltage characteristic sensitive to temperature and having first and second polarity terminals;
   delay line means having a plurality of spaced taps, each connected to one of said first polarity terminals of each of said diodes;
   a common signal return line electrically connected to the second polarity terminals of all of said diodes; pulse generating means connected to said delay line for propagating a pulse down said delay line past each of said taps, said propagated pulse sequentially gating said diodes into a conductive condition to provide a signal on said common line related to ambient temperature; and
   processing means connected to said signal line for converting signals on said signal line, resulting from said propagating pulse, by use of said current voltage characteristics to temperature values for each diode.

2. Temperature monitoring apparatus as in claim 1, where said apparatus includes a single triaxial connector which serves as an input for said pulse generating means and an output for said common signal return line.

3. Apparatus as in claim 1 where each of said plurality of thermal conductors is of a thin plate-like configuration, consisting of a material which is electrically insulating.

4. Apparatus as in claim 3 where said material of said thermal conductors is alumina or beryllia.

5. Apparatus as in claim 3 where the side of each of said thermal conductors opposite the thermally connected diode is coated with metal for shielding said diode from ambient electromagnetic radiation.

6. A method of monitoring temperature along a linear path, utilizing a plurality of temperature sensitive diodes spaced along said path, including the steps of connecting each of said diodes at separate and spaced taps of a delay line, propagating a pulse down said delay line to sequentially gate said diodes into conduction, and sensing the effect of the temperature influenced condutivity of the diode on said pulse as it passes a respective diode.

7. Monitoring apparatus comprising:
   a linear array of a plurality of sensing units, each responsive to a predetermined ambient condition in its proximity for determining the value of a variable of said unit;

a plurality of diode means, each connected to one of said sensing units and having a current voltage characteristic sensitive to said variable and having first and second polarity terminals;

delay line means having a plurality of spaced taps, each connected to one of said first polarity terminals to each of said diode means;

a common signal return line electrically connected to the second polarity terminals of all of said diode means; pulse generating means connected to said delay line for propagating a pulse down said delay line past each of said taps, said propagated pulse sequentially gating said diodes into a conductive condition to provide a signal on said common line related to said ambient condition; and processing means connected to said signal line for converting signals on said signal line, resulting from said propagating pulse, by use of said current voltage characteristics to a value for said variable for each diode means.

* * * * *